Aug. 22, 1967 R. S. HIATT, JR 3,337,688

TELEVISION SYNCHRONIZATION SYSTEM ADAPTED TO COMPENSATE FOR CABLE TIME DELAY BETWEEN CAMERA AND CAMERA CONTROL UNIT

Filed April 27, 1964

INVENTOR.
RICHARD S. HIATT, JR.
BY Lyon & Lyon
ATTORNEYS

United States Patent Office 3,337,688

Patented Aug. 22, 1967

3,337,688

TELEVISION SYNCHRONIZATION SYSTEM ADAPTED TO COMPENSATE FOR CABLE TIME DELAY BETWEEN CAMERA AND CAMERA CONTROL UNIT

Richard S. Hiatt, Jr., San Diego, Calif., assignor to Cohu Electronics, Inc., San Diego, Calif., a corporation of Delaware Filed Apr. 27, 1964, Ser. No. 362,783
5 Claims. (Cl. 178—69.5)

This invention relates to a television system and more particularly relates to a cable delay circuit for use in a television system in which a camera is connected to a camera control unit by a cable of relatively long length.

In a television broadcasting system, the scene to be telecast is viewed by a television camera which produces an electrical signal representative of the scene. The functioning of the camera is controlled by a camera control unit which may be located quite close to the camera but often is considerably removed therefrom. In the latter instance, the two units are connected by suitable electric conductors or cables.

The camera generally includes a television camera tube, a video preamplifier, and circuitry for controlling the horizontal deflection of the beam in the tube. The camera control unit generally includes a video amplifier which amplifies the output of the video preamplifier in the camera, a synchronizing generator for producing the various control pulses such as the horizontal drive pulses, the vertical drive pulses and blanking pulses, and circuitry for feeding the horizontal drive pulses to the horizontal deflection circuitry in the camera and a vertical deflection signal to the vertical yoke of the tube.

The synchronizing generator also feeds the blanking pulses to the video amplifier where they should be properly synchronized with the video signal from the video preamplifier to produce the proper composite television signal. However, if the distance separating the camera control unit from the camera is at all large, the time required for the horizontal drive pulse to travel from the camera control unit to the camera and for the resultant video signal to travel back from the camera to the camera control unit results in the blanking pulse being applied to the video amplifier prior to the application of the video signal from the video preamplifier.

This time discrepancy is generally compensated for by passing the blanking pulse through a delay line to delay its arrival at the video amplifier. Such delay lines are provided with a plurality of discrete taps so that different time delays can be chosen. These delay lines, however, do not permit continuously variable time delays and thus are not as versatile as is desirable.

It is therefore an object of the present invention to provide a continuously variable system for obtaining proper time relationship between the blanking pulses and the video signal at the video amplifier.

It is another object of the present invention to provide such a system in which a train of regenerated horizontal drive pulses are produced in response to the horizontal drive pulses, the pulses of the regenerated pulse train being delayed relative to the corresponding blanking pulses so that the video signal resultant from a regenerated drive pulse arrives at the video amplifier in proper time relationship with the next succeeding blanking pulse.

It is also an object of the present invention to provide such a system in which the duration of the delayed pulses can be adjusted to any desired width.

These and other objects and advantages of the present invention will become more apparent upon reference to the accompanying description and drawings in which.

Figure 1:
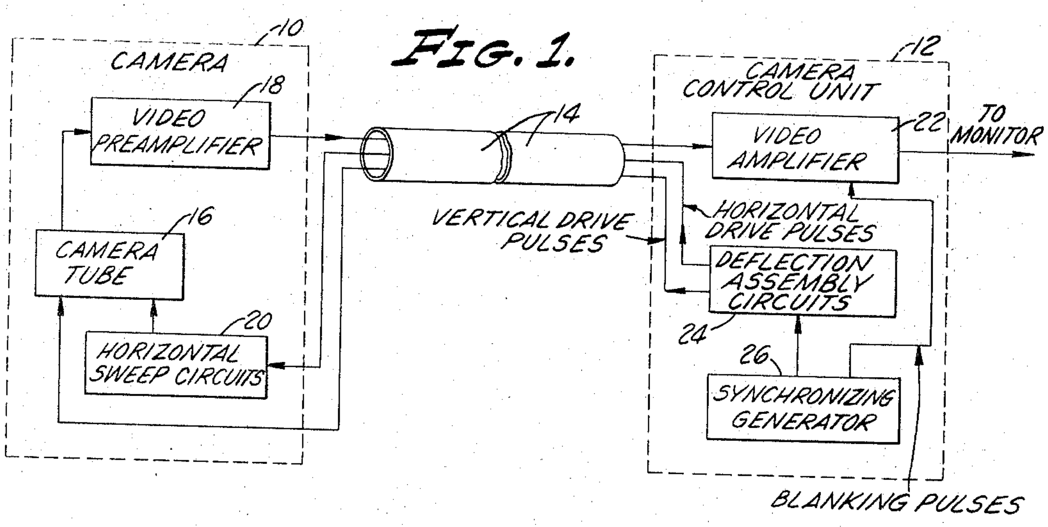
FIGURE 1 illustrates diagrammatically the television system in which the present invention is used.

Turning now to FIGURE 1, a television camera 10 is shown coupled to a camera control unit 12 by a long cable 14. The camera 10 includes a camera tube 16, the output of which is fed to a video preamplifier 18, and horizontal sweep circuits 20 which control the horizontal deflection of the beam of the camera tube 16.

The camera control unit 12 includes a video amplifier 22, deflection assembly circuits 24 and a synchronizing generator 26. The synchronizing generator 26 may be physically remote from the camera control unit, but remains functionally a part of it. The synchronizing generator 26 applies vertical drive pulses to a conventional portion of the deflection assembly circuits 24 which produces a vertical deflection signal that is applied to the vertical yoke of the camera tube 16 in the camera 10. The synchronizing generator 26 also applies horizontal drive pulses to another portion of the deflection assembly circuits 24.

Figures 2, 3:
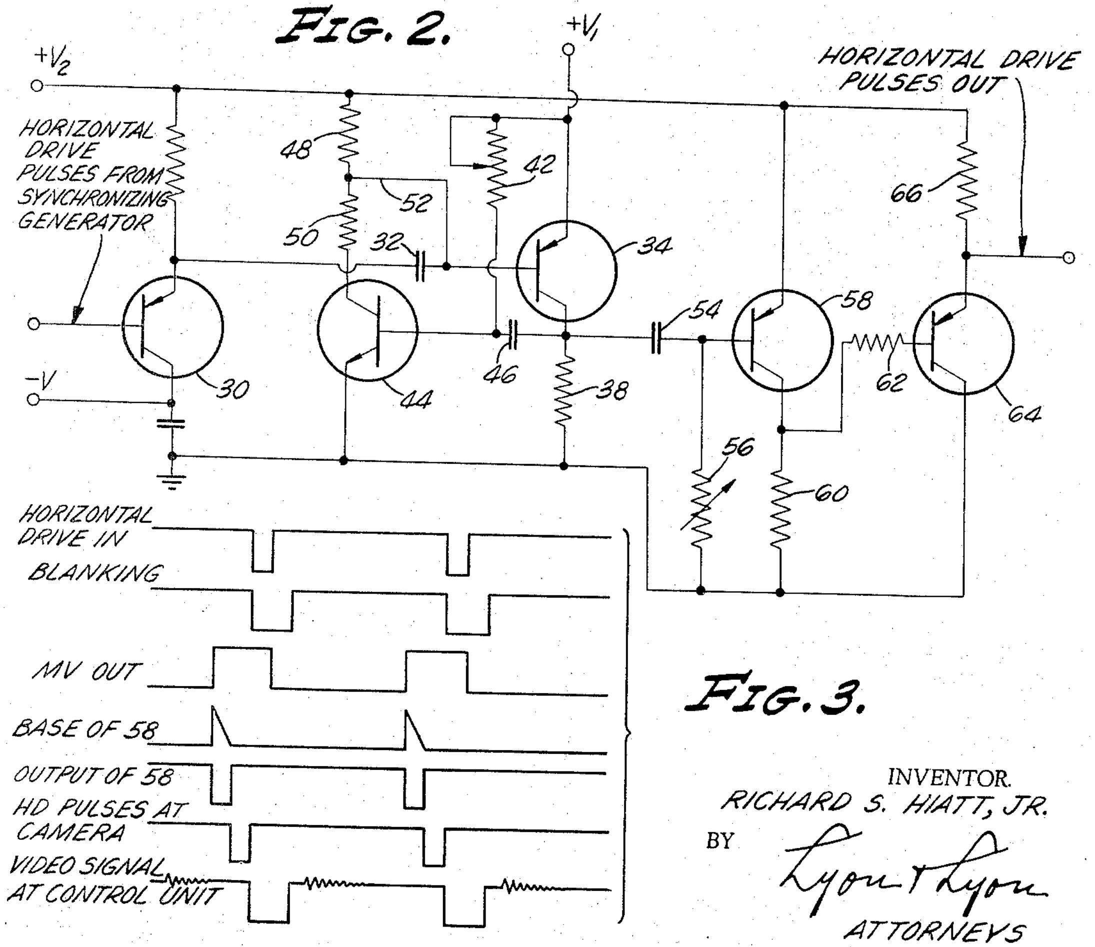
FIGURE 2 is a schematic diagram of the pulse delay circuit of the present invention.
FIGURE 3 shows waveforms present at various points of the television system.

This portion of the circuits is shown in detail in FIGURE 2 and serves to produce a train of regenerated horizontal drive pulses which are delayed in time with reference to the input horizontal drive pulses and which are fed to the horizontal sweep circuits 20 in the camera 10 to control the horizontal deflection of the camera tube 16. The pulse delay is adjusted such that the video signal produced by the video preamplifier 18 as a result of the horizontal drive pulses being applied to the horizontal sweep circuits 20 will arrive at the video amplifier 22 in proper time relationship with the blanking pulses which are fed to the video amplifier 22 by the synchronizing generator 26. These relationships are shown in FIGURE 3.

The details of the pulse delay circuit of the present invention are shown in FIGURE 2. In this figure, the horizontal drive pulses from the synchronizing generator 26 which are assumed to be negative in polarity are applied to the base of a PNP transistor 30 which serves as a buffer amplifier. The output of the buffer amplifier is coupled by a capacitor 32 to the base or control electrode of a PNP transistor 34 having its emitter connected to a first positive voltage supply $V_1$ and its collector connected by a resistor 38 to ground. The collector of the transistor 34 is also connected to the base of an NPN transistor 44 by a capacitor 46. The transistor 44 has its collector connected to a second positive voltage supply $V_2$ by resistors 48 and 50 and its emitter connected to ground. The junction of resistors 48 and 50 is connected to the base of transistor 34 by a feedback conductor 52. The base of transistor 44 is also connected by a variable resistor 42 to voltage supply $V_1$.

The collector of transistor 34 is also connected to a differentiating circuit including a capacitor 54 and a variable resistor 56, the junction of which is connected to the base of a PNP transistor 58. The emitter of the transistor 58 is connected to the positive voltage supply $V_2$ and the collector is connected to ground through a resistor 60. The collector of the transistor 58 is connected through a resistor 62 to the base of a PNP transistor 64 having its emitter connected by a resistor 66 to the positive supply $V_2$ and its collector grounded. The output of the circuit is taken at the emitter of the transistor 64.

In the circuit of FIGURE 2, the transistors 34 and 44 form a delay multivibrator which serves to introduce the desired delay while transistor 58, capacitor 54 and resistor 56 form a pulse narrower circuit which determines the width of the output pulse. In the quiescent or stable state, the transistors 34, 44 and 58 are normally conducting while the transistors 30 and 64 are normally nonconducting. When a negative pulse from the synchronizing generator 26 is applied to the base of the transistor 34 through buffer transistor 30 and differentiating capacitor 32, the positive going or trailing edge causes transistor 34 to cease conducting.

Before the transistor 34 turns off, there is substantially no charge on the capacitor 46. When the transistor 34 turns off, the potential at the collector drops while that at the emitter goes up with the result that the potential at the junction of the resistor 42 and capacitor 46 decreases. The decrease in potential on the base of the transistor 44 causes it to also cease conducting. When the transistor 44 ceases to conduct, the potential at the junctoin of the resistors 48 and 50 will rise and thus the signal fed back along the conductor 52 to the base of the transistor 34 will tend to keep this transistor in the nonconducting state.

When the transistor 34 ceases to conduct, the collector voltage decreases and a negative pulse is applied to the differentiating circuit 54, 56. Since the transistor 58 is already conducting, the leading edge of this negative pulse will have no effect on the transistor 58. However, the trailing edge of the pulse will be differentiated to form a positive spike which will turn off the transistor 58.

The duration of the unstable state, and thus the time delay, is determined by the value of the resistor 42 and capacitor 46. When both of the transistors 34 and 44 stop conducting, the capacitor 46 begins to charge through the resistor 42 until its potential is sufficiently high to again bias the transistor 44 into conduction. As soon as the transistor 44 beings to conduct, the potential at the junction between resistors 48 and 50 drops, applying a negative pulse over the line 52 to the base of the transistor 34, turning it on and terminating the negative pulse appearing at its collector.

When the transistor 58 is turned off by the trailing edge of the negative pulse applied to the differentiating circuit 54, 56, the negative pulse produced at its collector is applied through resistor 62 to the base of transistor 64 causing it to conduct. Conduction of transistor 64 results in a negative pulse being produced at its emitter. This pulse has a width determined by the time constant of differentiating circuit 54, 56 and a time delay determined by the value of variable resistor 42.

In a typical circuit constructed in accordance with the present invention, the following components were used:

| | | |
|---|---|---|
| Transistor **30** | | 2N404 |
| Capacitor **32** | pf | 500 |
| Transistor **34** | | 2N2400 |
| Resistor **38** | ohms | 270 |
| Resistor **42** | do | 3.9–8.9K |
| Capacitor **46** | mf | .01 |
| Transistor **44** | | 2N706 |
| Resistor **48** | ohms | 3.3K |
| Resistor **50** | ohms | 1K |
| Capacitor **54** | pf | 2700 |
| Resistor **56** | oms | 6.8K |
| Transistor **58** | | 2N404 |
| Resistor **60** | ohms | 1K |
| Resistor **62** | do | 680 |
| Transistor **64** | | 2N404 |
| Resistor **66** | ohms | 2.2K |

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a television system having a camera including a camera tube, a video preamplifier for amplifying the output of said tube, and horizontal sweep circuits for controlling the horizontal deflection in said tube; a camera control unit including a video amplifier for amplifying the output of said preamplifier, a synchronizing generator for producing horizontal drive pulses and blanking pulses and means for feeding said blanking pulses to said amplifier; and a cable coupling said camera with said camera control unit, the improvement comprising: circuit means in said camera control unit coupled to said synchronizing generator and responsive to said horizontal drive pulses for producing a train of delayed regenerated horizontal drive pulses for application through said cable to said sweep circuits, said circuit means comprising a monostable multivibrator having an input, an output and a variable timing network for determining the duration of the quasi-stable state of the multivibrator, means for applying said horizontal drive pulses to said input to drive said multivibrator into said quasi-stable state and produce a pulse at said output, a differentiating circuit coupled to said output for differentiating said pulse, and a transistor having its base coupled to said differentiating circuit, said transistor being responsive to the differentiated trailing edge of said pulse for producing said regenerated drive pulses, the duration of said pulses being determined by said differentiating circuit.

2. In a television system having a camera including a camera tube, a video preamplifier for amplifying the output of said tube, and horizontal sweep circuits for controlling the horizontal deflection in said tube; a camera control unit including a video amplifier for amplifying the output of said preamplifier, a synchronizing generator for producing horizontal drive pulses and blanking pulses and means for feeding said blanking pulses to said amplifier; and a cable coupling said camera with said camera control unit, the improvement comprising: circuit means in said camera control unit coupled to said synchronizing generator and responsive to said horizontal drive pulses for producing a train of delayed regenerated horizontal drive pulses for application through said cable to said sweep circuits, said circuit means comprising a monostable multivibrator having an input, an output and a variable timing network for determining the duration of the quasi-stable state of the multivibrator, means for applying said horizontal drive pulses to said input to drive said multivibrator into said quasi-stable state and produce a pulse at said output, a differentiating circuit having an adjustable time constant coupled to said output for differentiating said pulse, a transistor having its base coupled to said differentiating circuit, and means for normally biasing said transistor into conduction, said transistor being driven out of conduction in response to the differentiated trailing edge of said pulse for producing said regenerated drive pulses, the duration of said pulses being determined by the time constant of said differentiating circuit.

3. In a television system having a camera including a camera tube, a video preamplifier for amplifying the output of said tube, and horizontal sweep circuits for controlling the horizontal deflection in said tube; a camera control unit including a video amplifier for amplifying the output of said preamplifier, a synchronizing generator for producing horizontal drive pulses and blanking pulses and means for feeding said blanking pulses to said amplifier; and a cable coupling said camera with said camera control unit, the improvement comprising: circuit means in said camera control unit coupled to said synchronizing generator and responsive to said horizontal drive pulses for producing a train of delayed regenerated horizontal drive pulses for application through said cable to said sweep circuits, said circuit means comprising a first normally conducting transistor having a first electrode coupled to means for supplying current to said transistor and a second electrode coupled to a first resistor, means for applying said horizontal drive pulses to the control electrode of said first transistor to render it nonconductive and cause a pulse to appear across said resistor, a second normally conducting transistor having one electrode coupled to means for supplying current to said transistor, feedback means coupling the output of said second transistor to the control electrode of said first transistor, a variable resistor coupling the control electrode of said second transistor to said first electrode of said first transistor, a capacitor coupling said control electrode of said second transistor to said second electrode of said first transistor, a differentiating circuit having a variable time constant coupled to said output electrode of said first transistor for differentiating the pulse appearing at said output, a third normally conducting transistor having its emitter-collector circuit coupled to means for supplying a current to said transistor and its control electrode coupled to said differentiating circuit, said third transistor being driven out of conduction in response to the differentiated trailing edge of said pulse for producing said regenerated drive pulses, the duration of said pulses being determined by the time constant of said differentiating circuit.

4. In a television system having a camera including a camera tube, a video preamplifier for amplifying the output of said tube, and horizontal sweep circuits for controlling the horizontal deflection in said tube; a camera control unit including a video amplifier for amplifying the output of said preamplifier, a synchronizing generator for producing horizontal drive pulses and blanking pulses and means for feeding said blanking pulses to said amplifier; and a cable coupling said camera with said camera control unit, the improvement comprising: circuit means in said camera control unit coupled to said synchronizing generator and responsive to said horizontal drive pulses for producing a train of delayed regenerated horizontal drive pulses for application through said cable to said sweep circuits, said circuit means comprising a first normally conducting transistor having its emitter coupled to means for supplying a current to said transistor and its collector coupled to a resistor, means for applying said horizontal drive pulses to the base of said transistor to render it nonconductive and cause a pulse to appear across said resistor, a second normally conducting transistor having its collector coupled to means for supplying current to said transistor, and its emitter coupled to ground, feedback means coupling the collector of said second transistor to the base of said first transistor, a variable resistor coupling the base of said second transistor to the emitter of said first transistor, a capacitor coupling said base of said second transistor to the collector of said first transistor, a differentiating circuit including a second capacitor and a variable resistor, said second capacitor being coupled to said collector of said first transistor and said resistor being connected to ground, a third normally conducting transistor having its emitter coupled to means for supplying current to said transistor and its collector coupled to ground and its base coupled to the junction of said second capacitor and said resistor, said third transistor being driven out of conduction in response to the differentiated trailing edge of said pulse for producing said regenerated drive pulses, the duration of said pulses being determined by the time constant of said differentiating circuit.

5. The improvent of claim 4 wherein said first and third transistors are PNP transistors and said second transistor is a NPN transistor.

References Cited

UNITED STATES PATENTS

| | | | |
|---|---|---|---|
| 2,186,742 | 1/1940 | White | 178—7.2 |
| 3,165,585 | 1/1965 | James | 178—69.5 |
| 3,210,470 | 10/1965 | Pieters | 178—69.5 |
| 3,311,702 | 3/1967 | Legler | 178—69.5 |

JOHN W. CALDWELL, *Acting Primary Examiner.*

R. L. RICHARDSON, *Assistant Examiner.*